(12) United States Patent
Glass et al.

(10) Patent No.: US 7,496,801 B2
(45) Date of Patent: Feb. 24, 2009

(54) METHOD, APPARATUS AND SYSTEM FOR FACILITATING DEBUG FOR LINK INTERCONNECTS

(75) Inventors: Richard J. Glass, Olympia, WA (US);
Madhu S. Athreya, Saratoga, CA (US);
Keith A. Drescher, Olympia, WA (US);
Piyush Desai, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 528 days.

(21) Appl. No.: 11/167,965

(22) Filed: Jun. 27, 2005

(65) Prior Publication Data

US 2006/0294427 A1 Dec. 28, 2006

(51) Int. Cl.
*G06F 11/00* (2006.01)
(52) U.S. Cl. ...................................................... 714/57
(58) Field of Classification Search .................. 714/25, 714/57
See application file for complete search history.

(56) References Cited

U.S. PATENT DOCUMENTS

| | | | | |
|---|---|---|---|---|
| 5,657,442 A * | 8/1997 | Groves | | 714/28 |
| 6,003,143 A * | 12/1999 | Kim et al. | | 714/38 |
| 6,009,488 A | 12/1999 | Kavipurapu | | 710/105 |
| 6,105,059 A * | 8/2000 | Al-Karmi et al. | | 709/219 |
| 6,263,373 B1 * | 7/2001 | Cromer et al. | | 709/250 |
| 6,601,189 B1 * | 7/2003 | Edwards et al. | | 714/30 |
| 6,826,713 B1 * | 11/2004 | Beesley et al. | | 714/25 |
| 6,834,360 B2 * | 12/2004 | Corti et al. | | 714/37 |
| 6,859,891 B2 * | 2/2005 | Edwards et al. | | 714/30 |
| 6,892,324 B1 * | 5/2005 | French et al. | | 714/38 |
| 7,197,668 B1 * | 3/2007 | Hui et al. | | 714/39 |
| 7,216,276 B1 * | 5/2007 | Azimi et al. | | 714/733 |
| 2003/0115506 A1 * | 6/2003 | Edwards et al. | | 714/38 |
| 2004/0117770 A1 * | 6/2004 | Swoboda et al. | | 717/128 |
| 2007/0180323 A1 * | 8/2007 | Jones et al. | | 714/34 |

OTHER PUBLICATIONS

U.S. Appl. No. 11/284,459, filed Nov. 21, 2005, Roth.
U.S. Appl. No. 11/284,524, filed Nov. 21, 2005, Roth.

* cited by examiner

*Primary Examiner*—Robert Beausoliel
*Assistant Examiner*—Amine Riad
(74) *Attorney, Agent, or Firm*—Trop, Pruner & Hu, P.C.

(57) ABSTRACT

A scheme for exposing internal debug values in an in-band means via debug packets that are injected sequentially with normal link traffic on a link and do not interrupt or otherwise interfere with normal operation of the link or related devices. Therefore, this proposal does not require additional pins since the debug values are exposed via debug packets in an in-band means along with normal link traffic and the debug values are exposed synchronously with normal link traffic since the debug packets are injected sequentially.

23 Claims, 5 Drawing Sheets

| Overhead for all packets (start of packet framing, CRC, etc) | Unique identifier for each packet type: Debug type & Debug sub-types | Packet payload: = variable debug information: • Events • Exposed debug information • Timing information • other |
|---|---|---|

Figure 5

METHOD, APPARATUS AND SYSTEM FOR FACILITATING DEBUG FOR LINK INTERCONNECTS

BACKGROUND OF THE INVENTION

1. Field of the Invention

The present invention relates to debug and testing of computer systems, specifically, for observing and exposing values for link interconnect technology.

2. Description of the Related Art

As the technology for manufacturing integrated circuits advances and demand for increased processor and memory performance, the debugging and testing integrated devices have significantly become more complex. Modern integrated circuit (IC) devices include large numbers of gates on a single semiconductor chip. As the complexity of the ICs increase, so does the cost and complexity of verifying/debugging functionality and electrically testing the individual IC and the systems in which they are employed. Testing and manufacturing costs and design complexity increase dramatically because of new manufacturing processes and new interconnect technologies.

Present solutions to debug consist of requiring additional component pins, are pre-emptive and disruptive to the dynamic operation of the integrated devices and system since they require interruption of normal data traffic or operation mode changes of the integrated devices.

BRIEF DESCRIPTION OF THE SEVERAL VIEWS OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

FIG. 5 is a format for a debug packet as utilized by one embodiment of the claimed subject matter.

DETAILED DESCRIPTION OF THE INVENTION

In the following description, for purposes of explanation, numerous details are set forth in order to provide a thorough understanding of the present invention. However, it will be apparent to one skilled in the art that these specific details are not required in order to practice the present invention.

One area of current technological development relates to efficient system testing and validation. As previously described, the existing solutions are pre-emptive and disruptive to the dynamic operation of the integrated devices and system since they require either adding dedicated debug pins to devices or if adding debug information to the existing communication links cause interruption of normal data traffic or operation mode changes of the integrated devices.

In contrast, a method, apparatus, and system are proposed that facilitates debug by for exposing internal debug values in a in-band means via debug packets that are injected sequentially with normal link traffic on a link in such a manner that they do not interrupt or interfere with normal operation of the link or related devices. Consequently, the claimed subject matter does not require additional pins since the debug values are exposed via debug packets in an in-band means along with normal link traffic and the debug values are exposed synchronously with normal link traffic since the debug packets are injected sequentially.

The debug packets may be used to expose values, such as, but not limited to: a buffer in the chip reaching a certain fill level (empty, full, ½ full), a conflict occurring between two resources arbitrating for the same resource, an error being detected in data values or formats, or the credit values for each message class and virtual network can being sent upon sensing a predetermined link or another device internal event.

In one embodiment, the claimed subject matter facilitates debug on links that connect a Fully Buffered DIMMs (FBD), wherein the FBD link is a serial link for connecting memory modules to a host controller device (such as a processor or memory hub). Debug information can be transmitted from the FBD channel host to that it can be observed along the channel by channel traffic trace capture tools. The debug information can be decoded in real time to trigger trace capture framing at interesting points, based on information otherwise only present internal to the FBD channel host. The debug information can also be used to stimulate debug response mechanisms in the FBD devices, for example causing error injection to check downstream error detection and recovery mechanisms in hardware, firmware, and software.

Figure 1:
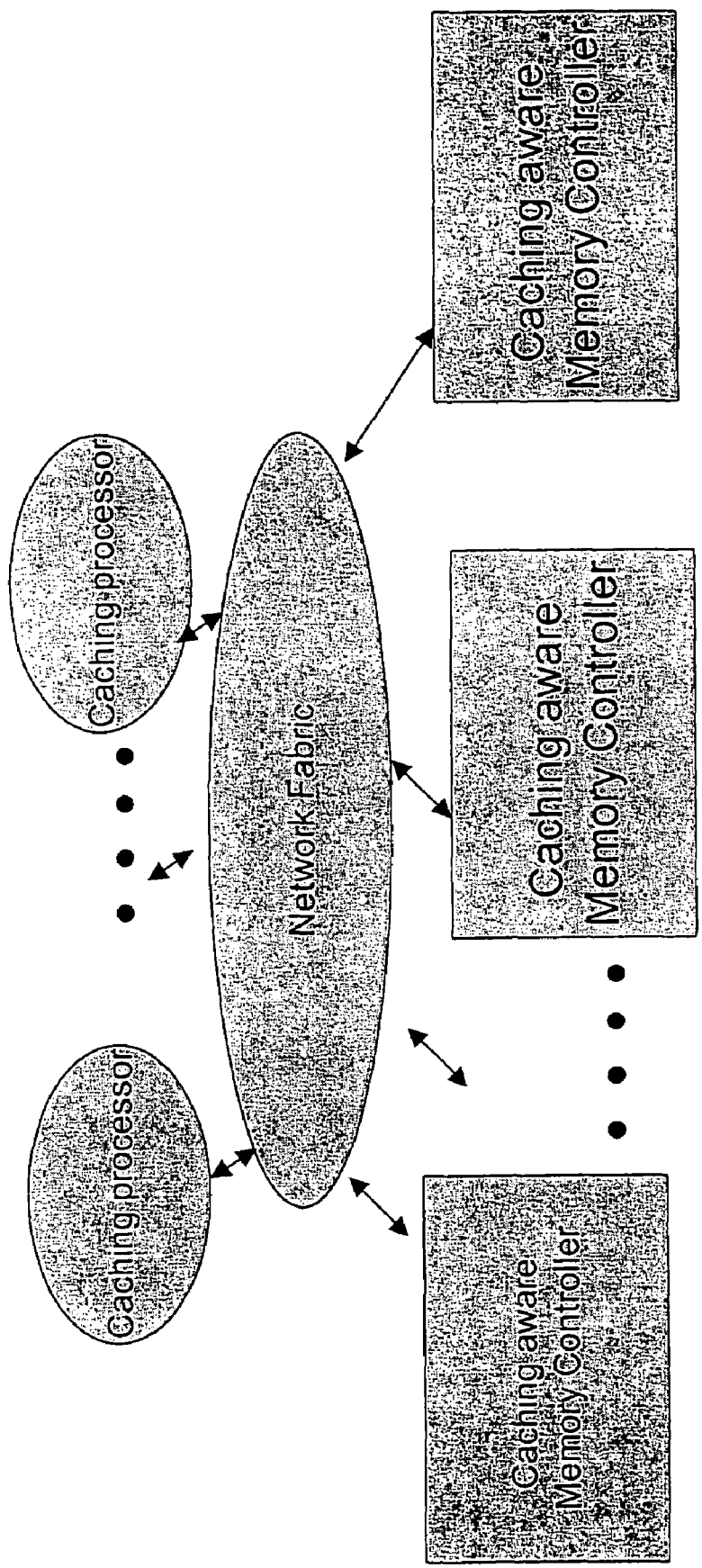
FIG. 1 is a protocol architecture as utilized by one embodiment.

In one embodiment, the claimed subject matter utilizes a point-to-point (pTp) architecture that supports a layered protocol scheme, FIG. 1 illustrates one example of a cache coherence protocol's abstract view of the underlying network. In one embodiment, the claimed subject matter may be utilized for an architecture that depicts a plurality of caching agents and home agents coupled to a network fabric (see FIG. 1). For example, the network fabric adheres to a layered protocol scheme and comprised of: a physical layer, a link layer, a routing layer, a transport layer and a protocol layer (as depicted in connection with FIG. 2). The fabric facilitates transporting messages from one protocol (home or caching agent) to another protocol for a point to point network. In one aspect, the figure depicts a cache coherence protocol's abstract view of the underlying network.

FIG. 1 is a high level, simplified abstraction of a protocol architecture as utilized by one embodiment. The fabric facilitates transporting messages from one protocol (caching processor or caching aware memory controller) to another protocol for a point to point network. In one aspect, the figure depicts a cache coherence protocol's abstract view of the underlying network.

Figure 2:
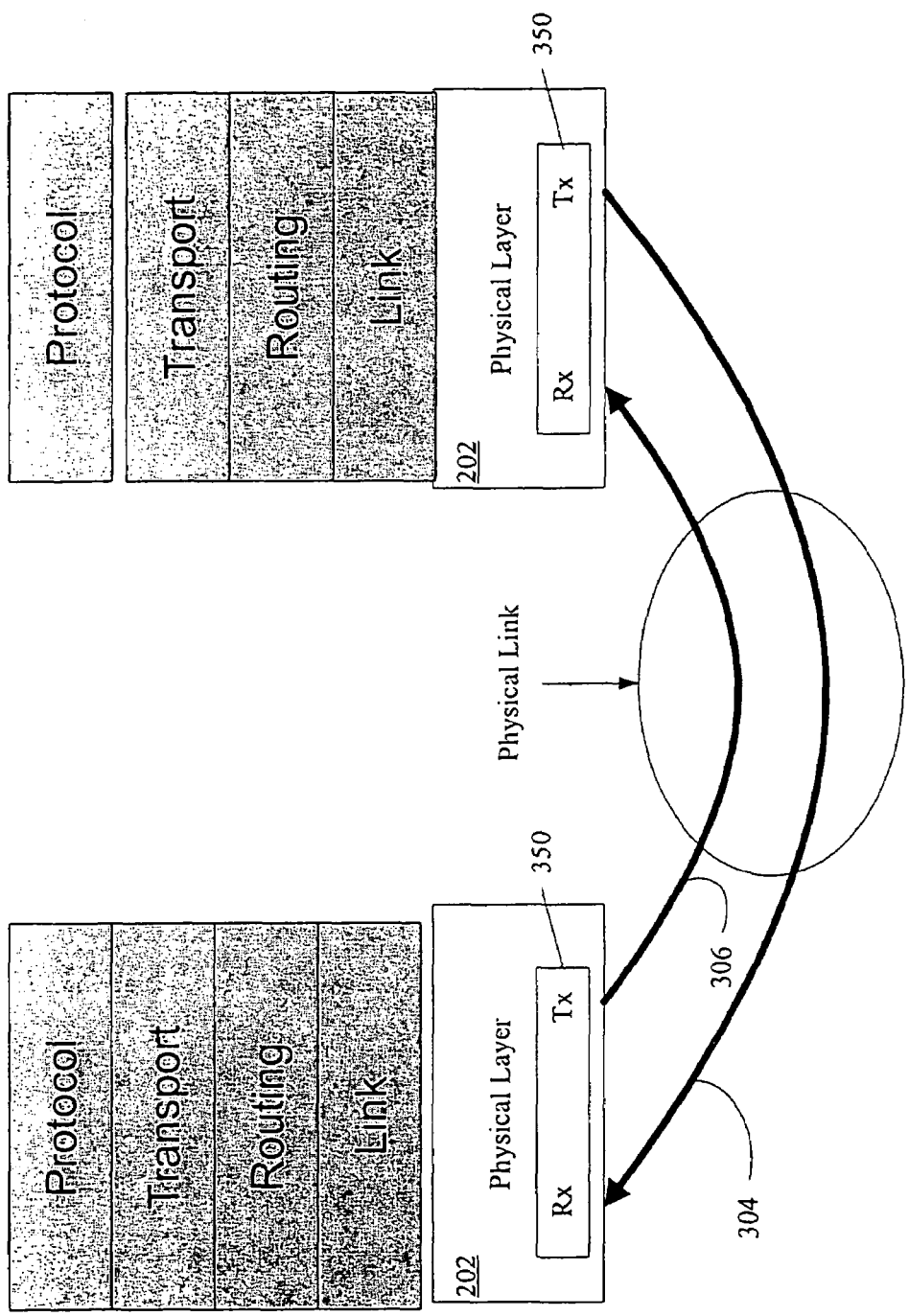
FIG. 2 is a block diagram of an apparatus for a physical interconnect utilized in accordance with the claimed subject matter.

FIG. 2 is a block diagram of an apparatus for a physical interconnect utilized in accordance with the claimed subject matter. In one aspect, the apparatus depicts a physical layer for a cache-coherent, link-based interconnect scheme for a processor, chipset, and/or IO bridge components. For example, the physical interconnect may be performed by each physical layer of an integrated device. Specifically, the physical layer provides communication between two ports over a physical interconnect comprising two uni-directional links. Specifically, one uni-directional link 304 from a first transmit port 350 of a first integrated device to a first receiver port 350 of a second integrated device. Likewise, a second uni-directional link 306 from a first transmit port 350 of the second integrated device to a first receiver port 350 of the first integrated device. However, the claimed subject matter is not limited to two uni-directional links. One skilled in the art appreciates the claimed subject matter supports any known signaling techniques, such as, bi-directional links, etc.

As illustrated In FIG. 5, a debug packet is differentiated from any other type of header by unique identifying encodings in the debug packet, consistent with definitions used for the specific link protocol. For example, the unique header identity of a debug packet would be an encoding not used for other purposes. The remainder of the debug packet is used to carry the debug information payload.

The debug packet in FIG. 5 is utilized by one embodiment of the claimed subject matter. Each packet in a protocol has overhead functions, as seen in the FIG. 5 first field. Each packet shall also include unique encoding in specific fields to differentiate between packet types. The debug packet encoding is in the second field. The debug payload fields of packets are used to expose internal states and other internally derived information of agents coupled to the point to point architecture. For example, the contents of the debug packets are implementation specific and could include any combination of the following: branch information, time stamps, sampled internal node values, information to create long instruction traces, etc. . . . Subsequently, the exposed data is captured by an observation tool, such as a link tracing logic analyzer for processing and analysis.

Figure 3:
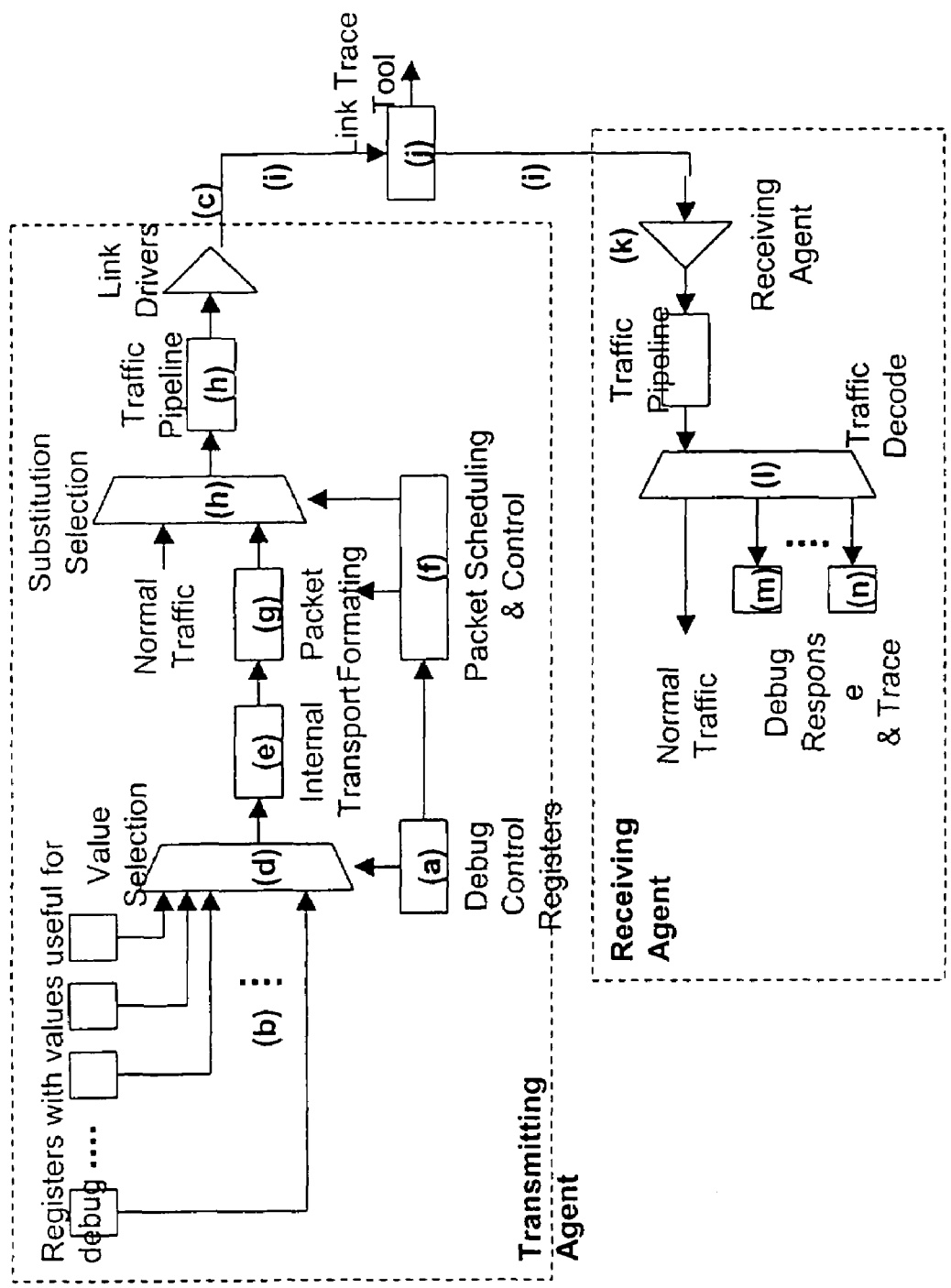
FIG. 3 is a block diagram as utilized by one embodiment of the claimed subject matter.

FIG. 3 is a block diagram as utilized by one embodiment of the claimed subject matter. The transmitting agent and receiving agent are connected via links as previously described in connection with FIG. 2. From a high level perspective for the transmitting agent, FIG. 3 depicts a plurality of debug control registers in each device (label a) that are used to select internal values (label b). The selected internal values will be observable on device links when they can be opportunistically transmitted without interfering with normal link traffic. This is possible if these debug packets are substituted for NOP/NULL packets, which are present only to preserve link timing and do not otherwise carry any useful information and so can be replaced without affecting the normal link traffic. This opportunistic exposure of the internal values is through each link port (label c) upon selection by a multiplexer (label d) and subsequent value internal transport/routing mechanisms (label e), debug packet scheduling/control (label f), packet formatting (label g), and insertion into normal link protocol pipelines (label h), for emission on the link (i). The link carries the exposed debug information to trace tools (j) and the opposite end link receiving agent (k).

In the receiving agent, the debug packets are selectively either dropped immediately or the content decoded (label l) to trigger pre-selected debug response mechanisms (label m) or the received payload values stored in local trace/registers (n) where they can be used to alter the behavior/modes of local debug or other mechanisms.

A more detailed explanation of this high level description follows in the next few paragraphs. From the transmitting agent, users select values to be exposed during each debug scenario based on problem context and capabilities of individual devices. Hence, device unique useful values are exposed for processing and analysis. For example, in one embodiment, values are selected by accessing on-chip controls through a target system executing code or via mechanisms like Joint Test Action Group (JTAG) Test Access Port (TAP) to set debug control register values. The register values select and enable specific values for exposure via specific links. Devices may support enabling exposure of either a single or multiple values. If multiple values can be enabled simultaneously the device provides control mechanisms to switch between the different values in useful sequences, and provides unique value identifiers in each packet along with the transmitted debug values. If useful, more than one value can be emitted in the same exposure packet, as long as additional information is provided in the packets to identify which particular fields format is used in each packet, or the external tool "knows" by (convention or programming) the format to expect. As link traffic gaps occur as result of not having normal useful packets to transmit, NOP packets would ordinarily be transmitted to fill the time slots. If opportunistic debug packet exposure is enabled and opportunistic values are scheduled for exposure, the transmit logic selects the next value to be exposed, formats it into the debug packet format and transmits it instead of a NOP packet.

From the trace tool's perspective, in one embodiment, the debug packets are protocol compliant packets. Therefore, the debug packets are readily recovered and decoded in link trace tools and in receiving link agents. Trace tools can be equipped with either mechanisms to recognize and decode/utilize the values passed in these packets, or they can simply use generic mask/match pattern recognition resources to trigger trace capture on these packets and/or specific values payload values they carry. The packets are also captured in traces of link traffic both as markers for events having occurred and carrying exposed device internal debug information for later analysis.

From the receiving agent's (the remote link agent) perspective, the debug packets can also be decoded to provide stimulus for debug response mechanisms that can modify the behavior of the device to assist in device or system debug.

Figure 4:
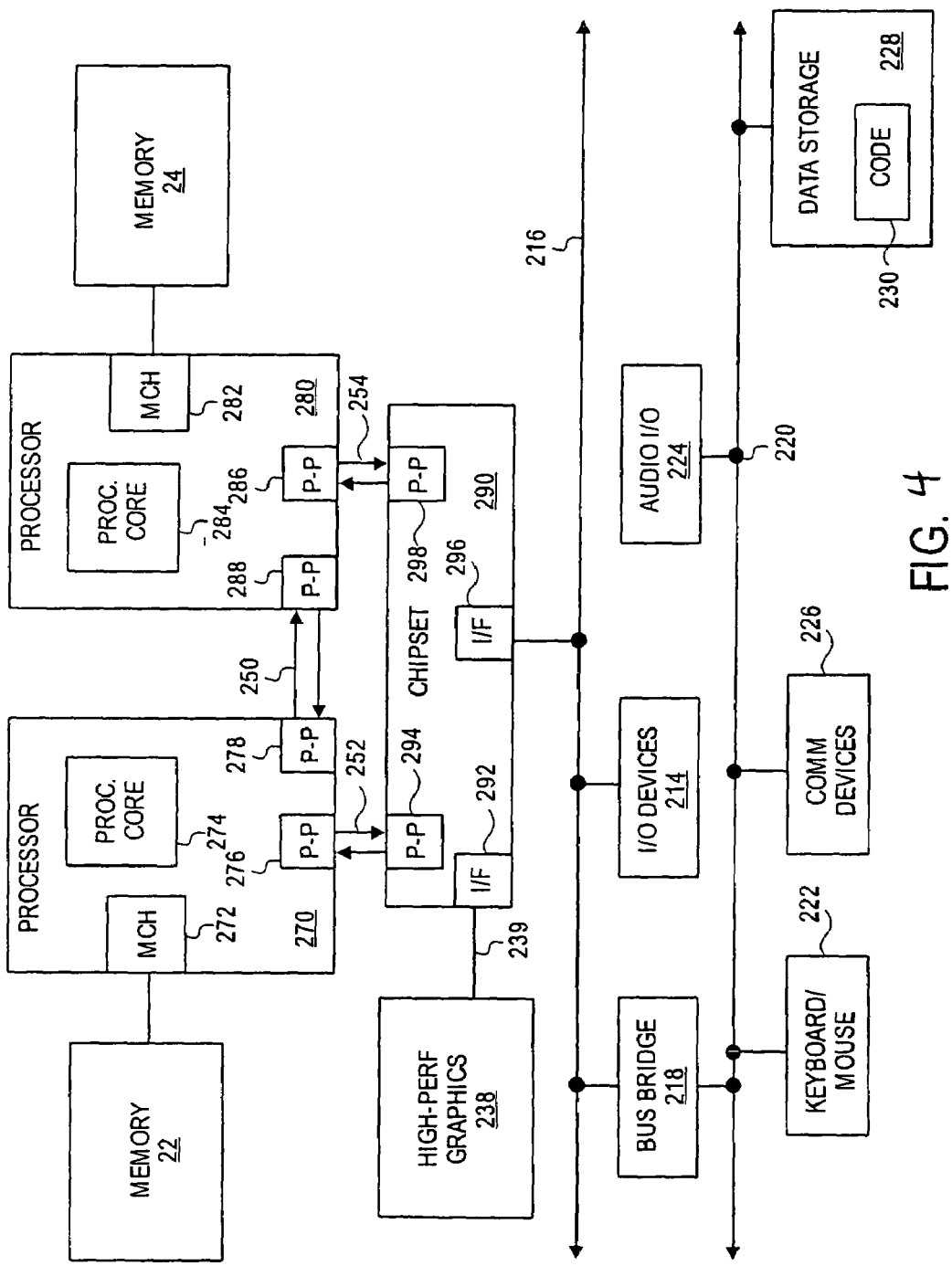
FIG. 4 represents multiple embodiments of a system.

FIG. 4 illustrates a computer system that is arranged in a point-to-point (PtP) configuration, with varying numbers of devices communicating via point to point links. In one embodiment, the point to point configuration supports the layered protocol scheme depicted in connection with FIGS. 1 and 2. In particular, FIG. 4 shows a system where processors, memory, and input/output devices are interconnected by a number of point-to-point interfaces. The system of FIG. 4 may also include several processors, of which only two, processors 270, 280 are shown for clarity. Processors 270, 280 may each include a local memory controller hub (MCH) 272, 282 to connect with memory 22, 24. Processors 270, 280 may exchange data via a point-to-point (PtP) interface 250 using PtP interface circuits 278, 288. Processors 270, 280 may each exchange data with a chipset 290 via individual PtP interfaces 252, 254 using point to point interface circuits 276, 294, 286, 298. Chipset 290 may also exchange data with a high-performance graphics circuit 238 via a high-performance graphics interface 239.

At least one embodiment of the invention may be located within the PtP interface circuits within each of the PtP bus agents of FIG. 2. Other embodiments of the invention, however, may exist in other circuits, logic units, or devices within the system of FIG. 2. Furthermore, other embodiments of the invention may be distributed throughout several circuits, logic units, or devices illustrated in FIG. 2.

Also, the claimed subject matter depicted in the previous Figures may be implemented in part in software or firmware. Varying elements of this mechanism can be performed by software or firmware interacting closely with lower level mechanisms which provide the communication link interface. For example, the said software may be stored in an electronically accessible medium that includes any mechanism that provides (i.e., stores and/or transmits) content (e.g., computer executable instructions) in a form readable by an electronic device (e.g., a computer, a personal digital assistant, a cellular telephone). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals).

Although the claimed subject matter has been described with reference to specific embodiments, this description is not meant to be construed in a limiting sense. Various modifications of the disclosed embodiment, as well as alternative embodiments of the claimed subject matter, will become apparent to persons skilled in the art upon reference to the description of the claimed subject matter. It is contemplated, therefore, that such modifications can be made without departing from the spirit or scope of the claimed subject matter as defined in the appended claims.

The invention claimed is:

1. An apparatus for a transmitting agent to generate debug packets comprising:
    the apparatus to select internal debug values from a plurality of registers or other device internal sources via a multiplexer and control registers;
    the apparatus to form the debug packets based on the selected internal debug values; and
    the apparatus to schedule the transmission of the debug packets sequential with normal link traffic, and further comprising a transport mechanism coupled to the output of the multiplexer, a packet formatter to receive the debug values from the transport mechanism and to format the debug values into the debug packets, and a second multiplexer coupled to the packet formatter to receive the debug packets and the normal link traffic and to select the debug packets or the normal link traffic for output from the transmitting agent.

2. The apparatus of claim 1 wherein the debug packets are opportunistically inserted in place of idle or no operation (NOP) packets.

3. The apparatus of claim 1 wherein the debug packets are forwarded from the transmitting agent via a link fabric both to a receiving agent and an observation tool for further analysis.

4. The apparatus of claim 3 wherein the transmitting agent and receiving agent are coupled via a link interconnect in a point to point architecture that supports a layered protocol scheme.

5. The apparatus of claim 4 wherein a link trace tool is to analyze the debug packet by either recognizing and decoding the values passed in the debug packets or utilize a mask/match pattern recognition to trigger on the values in the debug packets.

6. The apparatus of claim 1 wherein the internal debug values are selected by accessing on-chip control registers through a target system executing code or via mechanisms like Joint Test Action Group (JTAG) Test Access Port (TAP).

7. A method for testing for a point to point architecture with link interconnects comprising:
    selecting internal debug values of a first agent connected to a link interconnect via a first multiplexer and debug control registers, transporting the debug values via a transport mechanism coupled to the output of the first multiplexer, receiving the debug values from the transport mechanism and formatting the debug values into debug packets via a packet formatter;
    exposing the internal debug values in an in-band means via the debug packets that are injected sequentially and opportunistically with normal link traffic on the link interconnect via a second multiplexer coupled to the packet formatter to receive the debug packets and the normal link traffic and to select the debug packets or the normal link traffic for output from the first agent; and
    forwarding the debug packets to a second agent connected to the link interconnect.

8. The method of claim 7 wherein the debug packets are inserted in place of idle or no operation (NOP) packets in a manner that does not interfere with the normal link traffic.

9. The method of claim 7 wherein the debug packets are forwarded to the second agent, a receiving agent, and to an observation tool for further analysis.

10. The method of claim 9 wherein the first agent is a transmitting agent and the second agent is a receiving agent which are coupled via the link interconnect in the point to point architecture that supports a layered protocol scheme.

11. The method of claim 7 wherein a link trace tool analyzes the debug packet by either recognizing and decoding the values passed in the debug packets or utilizes a mask/match pattern recognition to trigger on the values in the debug packets.

12. The method of claim 7 wherein the internal debug values are selected by accessing on-chip controls through a target system executing code or via mechanisms like Joint Test Action Group (JTAG) Test Access Port (TAP).

13. An article of manufacture comprising:
    a machine-readable medium having a plurality of machine readable instructions, wherein when the instructions are executed by a system, the instructions to facilitate debug of a first agent in a point to point architecture with link interconnects connected to a second agent via one of the link interconnects:
    to select internal debug values to form debug packets based on the selected internal debug values via a first multiplexer and debug control registers, a transport mechanism coupled to the output of the first multiplexer, and a packet formatter to receive the debug values from the transport mechanism and to format the debug values into the debug packets; and
    to schedule the transmission of the debug packets opportunistically without interference with normal link traffic on the link interconnect via a second multiplexer coupled to the packet formatter to receive the debug packets and the normal link traffic and to select the debug packets or the normal traffic for output from the first agent.

14. The article of manufacture of claim 13 wherein the debug packets are inserted in place of idle or no operation (NOP) packets.

15. The article of manufacture of claim 13 wherein the debug packets are forwarded to a receiving agent and an observation tool for further analysis.

16. The article of manufacture of claim 13 wherein a link trace tool analyzes the debug packets by either recognizing and decoding the values passed in the debug packets or utilizes a mask/match pattern recognition to trigger on the values in the debug packets.

17. The article of manufacture of claim 13 wherein the internal debug values are selected by accessing on-chip controls through a target system executing code or via mechanisms like Joint Test Action Group (JTAG) Test Access Port (TAP).

18. An article of manufacture comprising:
    a machine-readable medium having a plurality of machine readable instructions, wherein when the instructions are executed by a system, the instructions to facilitate debug of a first agent in a point to point architecture with link interconnects connected to a second agent via one of the link interconnects comprising:
    selecting internal debug values of a first agent connected to a link interconnect via a first multiplexer and debug control registers, transporting the debug values via a transport mechanism coupled to the output of the first multiplexer, receiving the debug values from the transport mechanism and formatting the debug values into debug packets via a packet formatter;

exposing the internal debug values in an in-band means via the debug packets that are injected sequentially and opportunistically with normal link traffic on the link interconnect via a second multiplexer coupled to the packet formatter to receive the debug packets and the normal link traffic and to select the debug packets or the normal link traffic for output from the first agent; and forwarding the debug packets to a second agent or a link trace tool connected to the link interconnect.

19. The article of manufacture of claim 18 wherein the debug packets are inserted in place of idle or no operation (NOP) packets.

20. The article of manufacture of claim 18 wherein the debug packets are forwarded to the second agent, a receiving agent, and to an observation tool for further analysis.

21. The article of manufacture of claim 18 wherein a link trace tool analyzes the debug packets by either recognizing and decoding the values passed in the debug packets or utilizes a mask/match pattern recognition to trigger on the values in the debug packets.

22. The article of manufacture of claim 18 wherein the internal debug values are selected by accessing on-chip controls through a target system executing code or via mechanisms like Joint Test Action Group (JTAG) Test Access Port (TAP).

23. The apparatus of claim 5, wherein the link trace tool is coupled between the transmitting agent and the receiving agent.

* * * * *